United States Patent [19]

Komiya et al.

[11] Patent Number: 4,647,188

[45] Date of Patent: Mar. 3, 1987

[54] IMAGE FORMING SYSTEM

[75] Inventors: Yutaka Komiya; Shinichi Nakamura, both of Tokyo; Masanori Miyata; Masayuki Hirose, both of Yokohama; Toshihiko Mori, Tokyo, all of Japan

[73] Assignee: Canon Kabushiki Kaisha, Tokyo, Japan

[21] Appl. No.: 742,866

[22] Filed: Jun. 10, 1985

[30] Foreign Application Priority Data

Jun. 12, 1984 [JP] Japan ................................ 59-119111

Jun. 12, 1984 [JP] Japan ................................ 59-119112

[51] Int. Cl.⁴ ................................................ G03B 27/52

[52] U.S. Cl. .................................... 355/55; 355/14 R

[58] Field of Search .................................... 355/55–59, 355/14 R, 14 C, 8, 11

[56] References Cited

U.S. PATENT DOCUMENTS

| | | | |
|---|---|---|---|
| 4,277,163 | 7/1981 | Ikesue et al. | 355/56 X |
| 4,351,606 | 9/1982 | Franko | 355/14 R |
| 4,393,375 | 7/1983 | Sugiura et al. | 355/14 R X |
| 4,440,487 | 4/1984 | Miura | 355/14 R |
| 4,442,505 | 4/1984 | Takano | 355/14 R |
| 4,505,574 | 3/1985 | Kurata et al. | 355/14 R X |
| 4,514,080 | 4/1985 | Matsuzawa et al. | 355/55 X |
| 4,543,643 | 9/1985 | Shibazaki et al. | 355/55 X |

*Primary Examiner*—Richard A. Wintercorn

*Attorney, Agent, or Firm*—Fitzpatrick, Cella, Harper & Scinto

[57] ABSTRACT

An image forming system has on original size detector, a paper size selection key, a magnification factor selection key, a paper size automatic selection key, a magnification factor automatic set key, a display for displaying if the magnification factor automatic set key, a display for displaying if the magnification factor automatic selection mode is selected, a display for displaying if the paper size automatic selection mode is selected, a magnification factor automatic set unit for automatically setting a magnification factor when the magnification factor automatic mode is set, a paper size automatic selector for automatically selecting a paper size when the paper size automatic selection mode is set, a mode reset unit for resetting a proper mode when a manually input paper size and an automatically calculated paper size are both available or when a manually input magnification factor and an automatically calculated magnification factor are both available, and an automatic selection mode controller for generating an adjusted paper size or an adjusted magnification factor when a copy operation can be performed with the adjusted paper size or magnification factor even if a conflict has occurred.

10 Claims, 21 Drawing Figures

IMAGE FORMING SYSTEM

BACKGROUND OF THE INVENTION

1. Field of the Invention

The present invention relates to an image forming system which has a reproduction factor automatic selection mode for automatically setting a reproduction factor and a paper size automatic selection mode for automatically selecting a paper size, and which can automatically form an optimal image in accordance with a size of each of original.

2. Description of the Prior Art

In one conventional copying machine, a transfer paper of a size optimal for an intended copying operation is automatically selected in accordance with a detected original size and a preset reproduction factor. In another conventional copying machine, a reproduction factor is automatically preset in accordance with a detected original size and a detected paper size. In accordance with automatic copying operation performed in a conventional copying machine of this type, normally, two parameters are selected from three parameter, i.e., an original size, a transfer paper size and a reproduction factor (or a magnification factor), so as to uniquely determine the remaining one parameter. An automatic copying operation is performed in accordance with the three parameters determined in this manner. For example, when the user sets an original, designates a paper size and selects the reproduction factor automatic selection mode, the reproduction factor is automatically calculated and proper copying operation can be performed irrespective of the original size. When the user sets an original, designates a reproduction factor and selects the paper size automatic selection mode, paper of a proper size is automatically selected. For this reason, a desired copy can be obtained even if the operator does not have any knowledge as to the paper size and reproduction factor.

However, the operator may erroneously set both the paper size automatic selection mode and the reproduction factor automatic selection mode. The operator may also set a paper size even if he has already selected the paper size automatic selection mode.

As described above, in a copying machine having the reproduction factor automatic selection mode or the paper size automatic selection mode, the operation procedure on the side of the operator is simplified, and almost no error occurs in the copying operation. For example, when a need arises for copying an image of A3 size on a paper having A4 size or when an image of A3 must be reduced in half, the required reproduction factor or the required cassette (in this case A4R) can be automatically selected and the operator need not know why such reproduction factor or cassette is required.

However, due to limits in the number of combinations available from a single type of machine, some specific copying operations cannot be performed. For example, when an original image of B5 size is to be copied with a reproduction factor of 50% or less, the copying operation cannot be performed unless the machine has a cassette of a size smaller than B5 size mounted thereon. When an image of A3 size is to be reproduced on paper having A5 size, the copying operation cannot be performed if the machine allows setting of reproduction factor exceeding only 50%.

SUMMARY OF THE INVENTION

It is an object of the present invention to eliminate the above-mentioned drawbacks of the conventional systems.

It is another object of the present invention to provide an improvement in an imaging forming system.

It is still another object of the present invention to provide an image forming system with an improved function.

It is still another object of the present invention to provide an image forming system with an improved operability.

It is still another object of the present invention to provide an improvement in an image forming system which has a reproduction factor automatic selection function and a paper size automatic selection function.

The above and other objects, advantages and features of the present invention will become apparent from the accompanying drawings and the appended claims.

BRIEF DESCRIPTION OF THE DRAWINGS

FIGS. 6 6A and 6B and 7 7A and 7B are flow charts for explaining the mode of operation of the circuit shown in FIG. 5; and FIGS. 8 8A and 8B and 9 9A and 9B are control flow charts for explaining the mode of operation according to a third embodiment of the present invention.

DETAILED DESCRIPTION OF THE PREFERRED EMBODIMENTS:

The preferred embodiment of the present invention will be described in detail with reference to the accompanying drawings.

Figure 1:
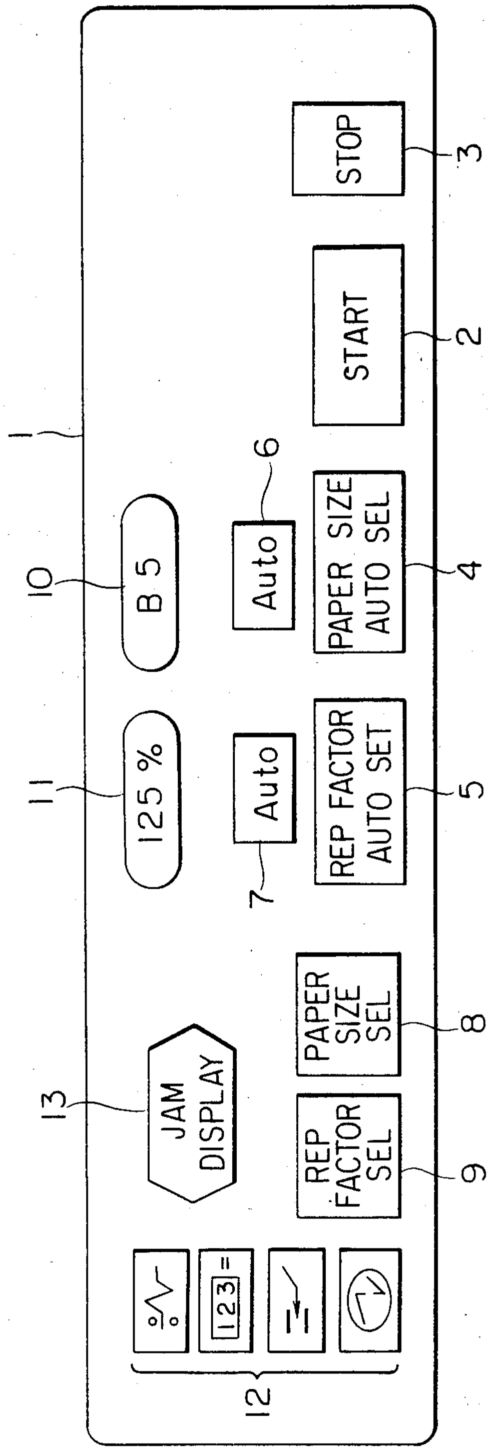
FIG. 1 is a plan view of an operation panel of a copying machine according to an embodiment of the present invention.
Figure 2:
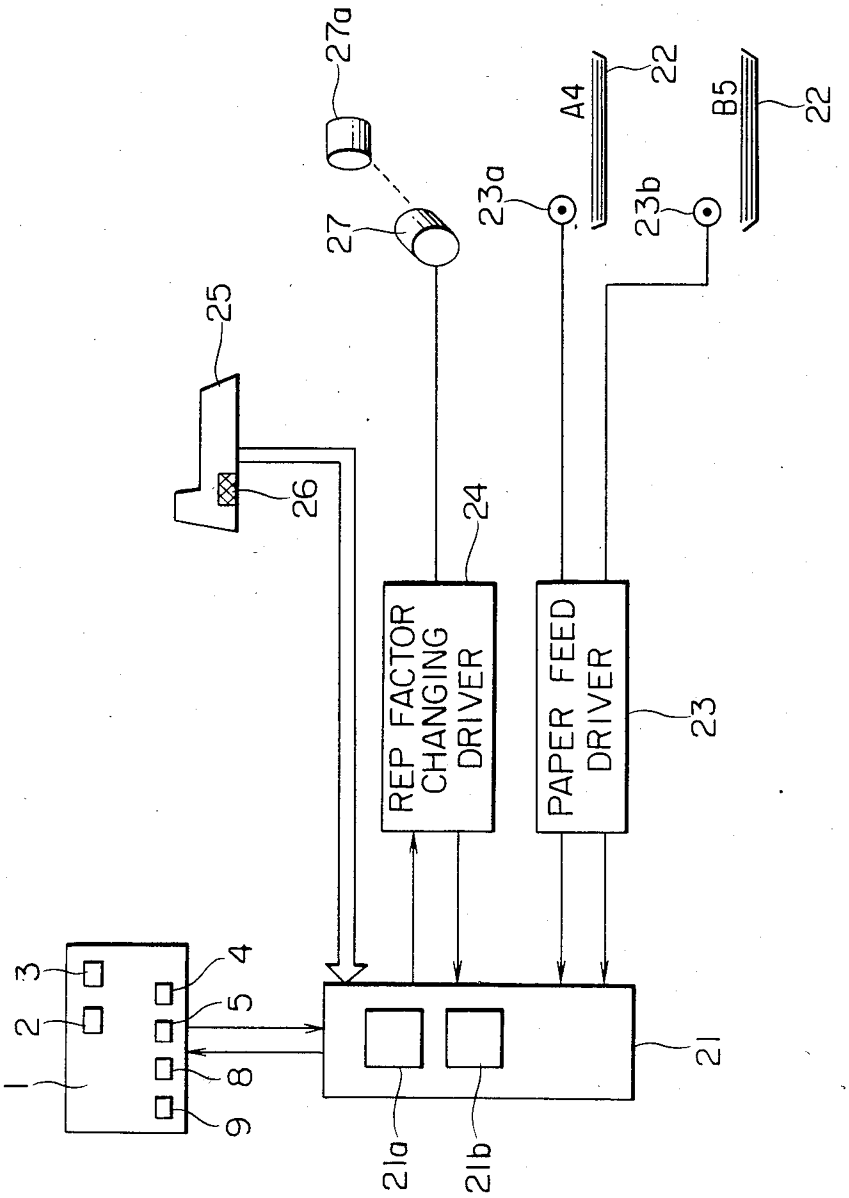
FIG. 2 is block diagram of a control circuit in the first embodiment of the present invention.

FIGS. 1 and 2 are a plan view of an operation panel of a copying machine according to a first embodiment, and a control block diagram thereof.

Referring to FIG. 1, various keys including a copy start key 2 for starting the copying operation and a stop key 3 for stopping it are arranged on an operation panel main body 1. A paper size automatic selection key 4 is used to set the paper size automatic selection mode. A reproduction factor or a magnification factor automatic set key 5 is used to set the reproduction factor automatic selection mode. When the key 4 is depressed, a paper size automatic selection mode indicator 6 is turned on. When the key 5 is depressed, a reproduction factor automatic selection mode indicator 7 is turned on. A paper size selection key 8 is used to manually designate a predetermined paper size, e.g., A4 or B5 size. A reproduction factor selection key 9 is used to manually input a desired reproduction factor. Using the key 9, a reproduction factor within a range of, e.g., 64 to 142% can be set. A specific reproduction factor such as from "A4 to B5" can also be designated. A paper size display 10 displays the paper size selected by the paper size selection key 8 or by the paper size automatic selection mode. A reproduction factor display 11 displays a reproduction factor selected by the reproduction factor selection key 9 or by the reproduction factor selection mode. An indicator section 12 indicates a fault (including jam) and modes such as interrupt. A jam display 13 displays occurrence of a jam inside the machine.

Referring to FIG. 2, a controller 21 comprises a microprocessor or the like. The controller 21 receives various data input on the operation panel main body 1 and supplies drive signals to the optical scanning system, the paper feed system and the copying system. A mode operation means 21*a* of the controller 21 performs detection to determine if the paper size automatic selection mode or the reproduction facter automatic selection mode is stably set. A reset means 21*b* of the controller 21 supplies to the operation panel main body 1 a reset signal for resetting the paper size automatic selection mode or the reproduction factor automatic selection mode and for turning off the paper size automatic selection indicator 6 or the reproduction factor automatic selection indicator 7. Paper feed cassettes 22 correspond to respective normal paper sizes. A cassette feed driver 23 has a paper size detection means. The driver 23 drives either a paper feed roller 23*a* or 23*b* in accordance with a paper size designated by the paper size selection key so as to convey a paper sheet of a desired size from the corresponding cassette 22. A reproduction factor changing driver 24 and an automatic document feeder (ADF) 25 having an original size detector 26 as an original size detection means are connected to the controller 21. A drive motor 27 drives a lens 27*a* of the optical scanning system according to the selected or automatically set reproduction factor.

When the operator depresses the paper size selection key 8 and designates B5 size, for example, "B5" is indicated by the paper size display 10. When the reproduction factor automatic set key 5 and the copy start key 2 are subsequently depressed in the order named, the cassette feed driver 23 drives the paper feed roller 23*b*, for example, so as to convey a paper sheet of B5 is from the lower paper feed cassette 22. The controller 21 detects the size B4, for example, of an original by means of the original size detector 26, calculates reproduction factor from the detected original size B4 and paper size B5, and transmits the reproduction factor data of the optical scanning system to the reproduction factor changing driver 24. As a result, the driver 24 controls the drive motor 27 so as to move the lens 27*a* to the position corresponding to the calculated reproduction factor. The calculated reproduction factor is displayed at the reproduction factor display 11. Then, the machine starts the copying operation in the reproduction factor automatic selection mode.

The mode of operation in the paper size automatic selection mode will be described.

When the operator depresses the reproduction factor selection key 9 and sets a reproduction factor of 125%, for example, for an original of B5 size, "125%" is displayed at the reproduction factor display 11. When the paper size automatic setting key 4 and the copy start key 2 are then depressed in the order named, the reproduction factor changing driver 24 receives the reproduction factor data and drives the drive motor 27 accordingly. The drive motor 27 moves the lens 27*a* to the position corresponding to the received reproduction factor data. The controller 11 detects the size of an original by the original size detector 26, and calculates an optimal paper size in accordance with the original size and the preset reproduction factor. The calculated paper size is displayed at the paper size display 10. When the paper size is calculated to be A4, for example, the paper feed driver 23 is driven so as to convey a paper sheet of A4 size from the upper paper feed cassette 22 to the copying system. Then, the copying operation is started in the paper size automatic selection mode.

The operation of the mode operation means 21*a* will be described below.

When the operator depresses the reproduction factor automatic set key 5 and then erroneously depresses the paper size automatic selection key 4, the mode operation means 21*a* detects a conflict since the reproduction factor automatic selection mode and the paper size automatic selection mode are simultaneously set. Thus, the mode operation means 21*a* releases both the reproduction factor automatic selection mode and the paper size automatic selection mode, turns off the reproduction factor automatic selection mode indicator 7 which was turned on first, and awaits resetting of either the reproduction factor automatic selection mode or the paper size automatic selection mode by the operator.

The operation of the resetting means 21*b* will be described.

For an original of A3 size, assume that the operator depresses the reproduction factor automatic set key 5 to select the reproduction factor automatic selection mode, operates the paper size selection key 8 so as to designate a paper size of A4, for example, and operates the reproduction factor selection key 9 to set the equal size (100%). Then, the equal size of "100%" is displayed at the display 11. The resetting means 21*b* detects the conflict, and generates a reset signal for releasing the reproduction factor automatic selection mode so as to turn off the reproduction factor automatic selection mode indicator 7.

When the indicator 7 is turned off, the operator is signalled the occurrence of conflict and depression of the stop key 3 or the copy start key 2 is awaited.

When the stop key 3 is depressed, the operator sets a reproduction factor or paper size together with the paper size automatic selection mode or the reproduction factor automatic selection mode.

When the copy start key 2 is depressed, a copy of equal size "100%" displayed at the display 11 is formed. In other words, a portion of the original having A3 size is copied in equal size on the paper sheet of A4 size.

Similarly, assume a case wherein the operator sets the paper size automatic selection mode by depressing the paper size automatic selection key 4 for an original of A3 size, designates a reproduction factor of 125% using the key 9, and selects B5 size using the key 8. Then, "B5" is displayed on the display 10. In this case, the resetting means 21*b* recognizes the conflict and generates a reset signal for releasing the paper size automatic selection mode to turn off the paper size automatic selection mode indicator 6. Then, the operator is signalled the occurrence of conflict, and depression of the stop key 3 or the copy start key 2 is awaited.

When the stop key 3 is depressed in this case, the operator sets a reproduction factor or a paper size together with the paper size automatic selection mode or the reproduction factor automatic selection mode.

When the copy start key 2 is depressed, the original image is reproduced on a paper sheet or B5 size which is displayed on the display 10. The reproduced image is a 125% enlarged image of a portion of the original image of A3 size.

The control operation will be described with reference to the flow charts shown in FIGS. 3 and 4.

Figures 3, 3B:
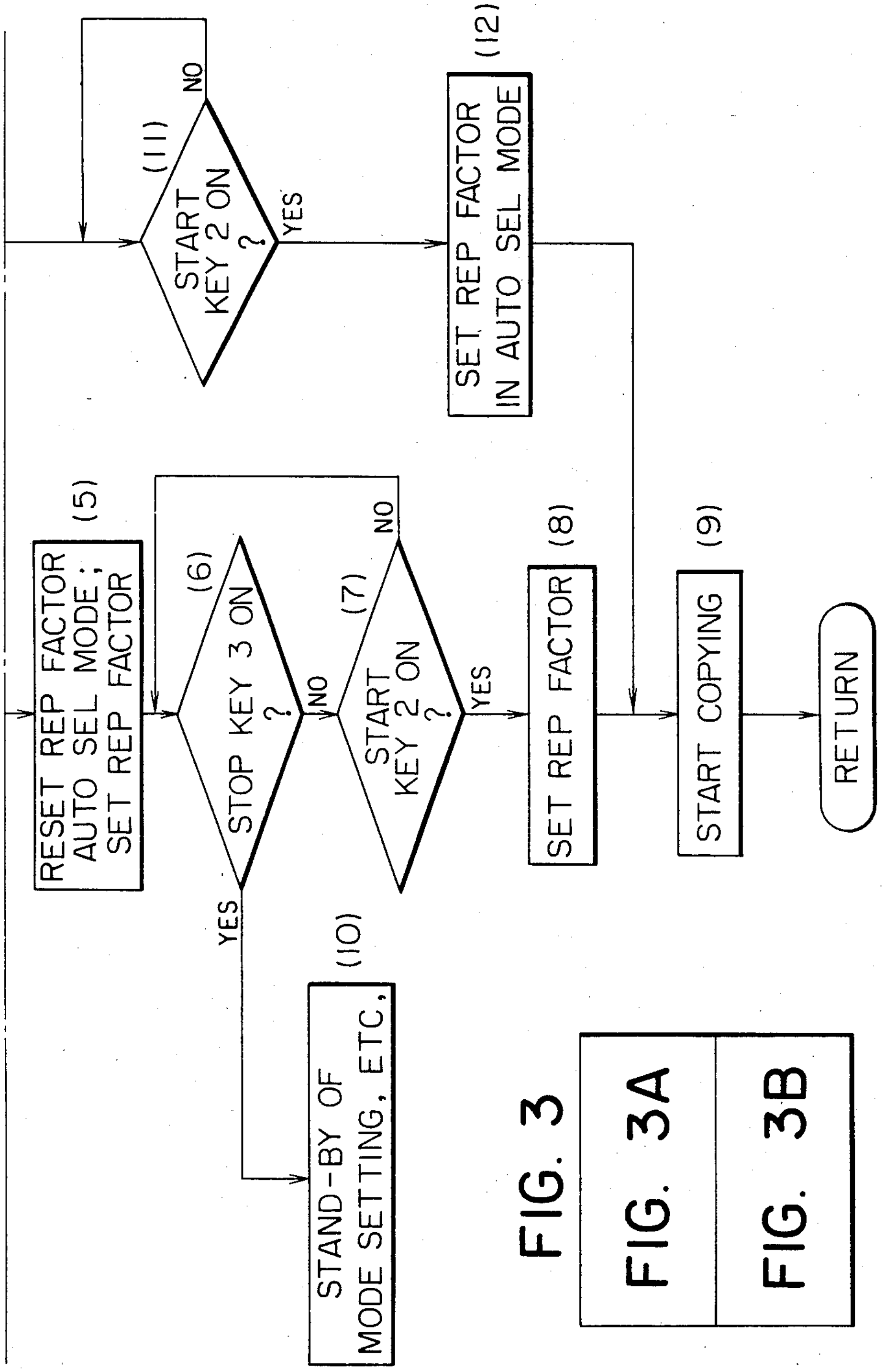
FIGS. 3, 3A and 3B and 4 4A and 4B are flow charts for explaining the mode of operation of the circuit shown in FIG. 2.
Figure 3A:
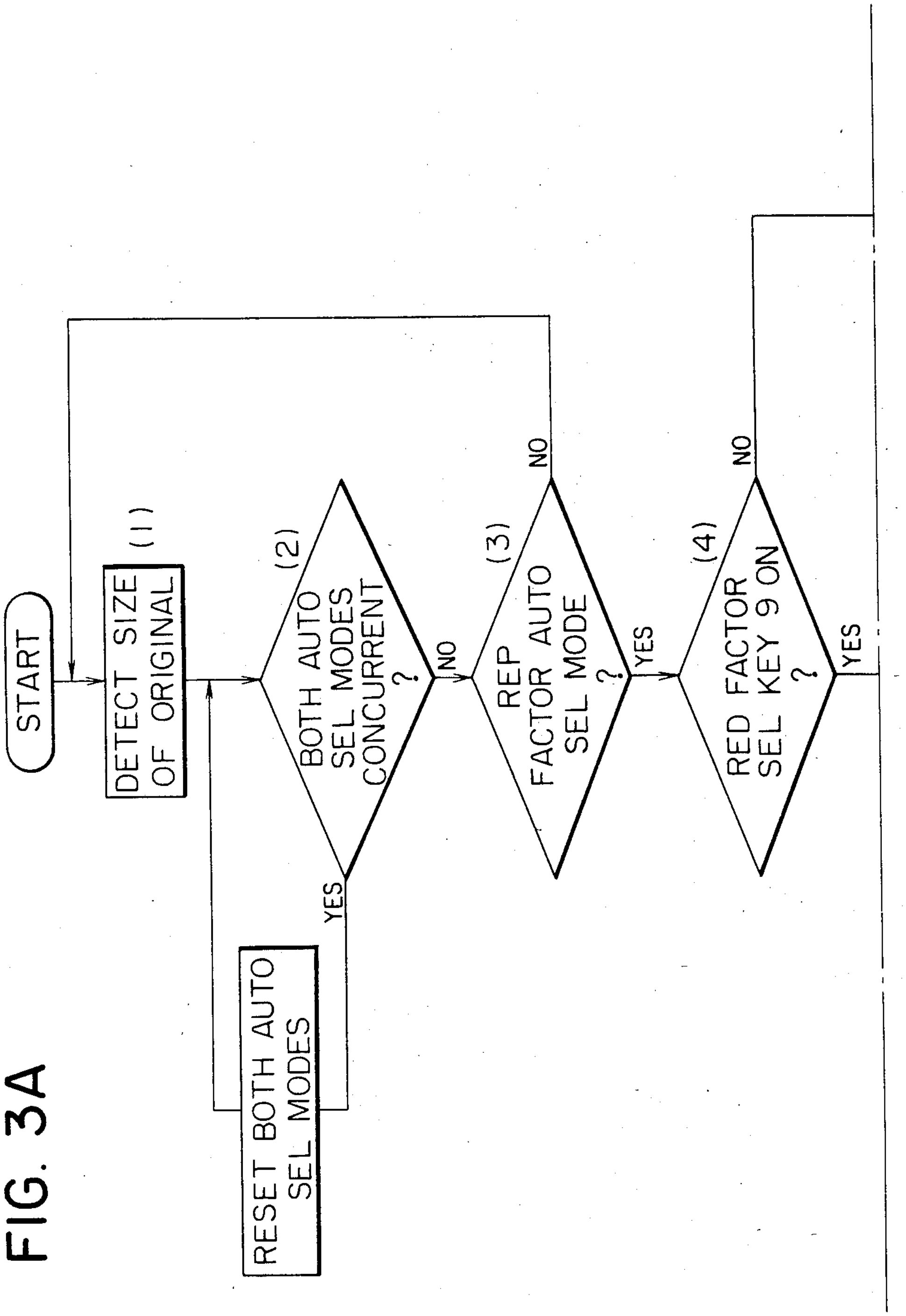

FIG. 3 is the flow chart showing an example of copying control sequence in the reproduction factor automatic selection mode.

The original size is detected by the original size detector 26, and setting of the paper size by the paper size selection key 8 or reproduction factor automatic selection mode is awaited (step 1). It is then checked in step 2 if both the reproduction factor automatic selection mode and the paper size automatic selection mode are selected. If YES in step 2, both the modes are released. However, if NO in step 2, it is then checked in step 3 if the selected mode is the reproduction factor automatic selection mode. If NO in step 3, the flow returns to step 1. If YES in step 3, it is checked in step 4 is there is a reproduction factor input. If YES in step 4, the selected reproduction factor automatic selection mode is released by the resetting means 21*b*, and the reproduction factor input by the reproduction factor selection key 9 is set in step 5. Depression of one of the stop key 3 and the copy start key 2 is awaited in steps 6 and 7. When the stop key 3 is depressed, the reproduction factor set in step 4 is released and resetting of either automatic selection mode together with a paper size or a reproduction factor is awaited in step 10. However, when the copy start key 2 is depressed, the lens 27*a* is moved in step 8 to set the reproducion factor set in step 4 and starts the copying operation in step 9. However, if NO in step 4, depression of the copy start key 2 is awaited in step 11. When YES in step 11, the reproduction factor is calculated from the detected original size and the set paper size in step 12, and the flow returns to step 9.

Figures 4, 4B:
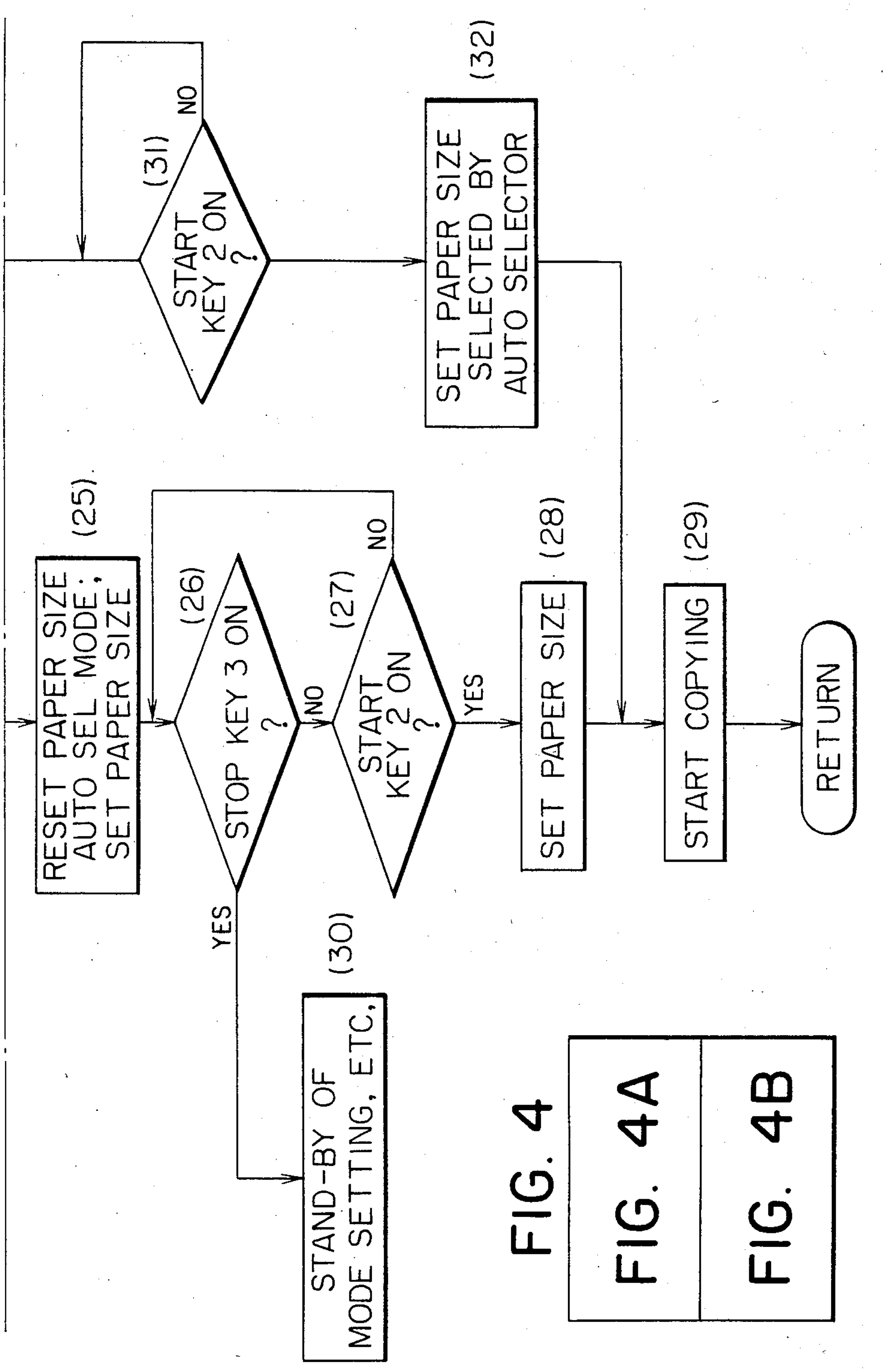
Figure 4A:
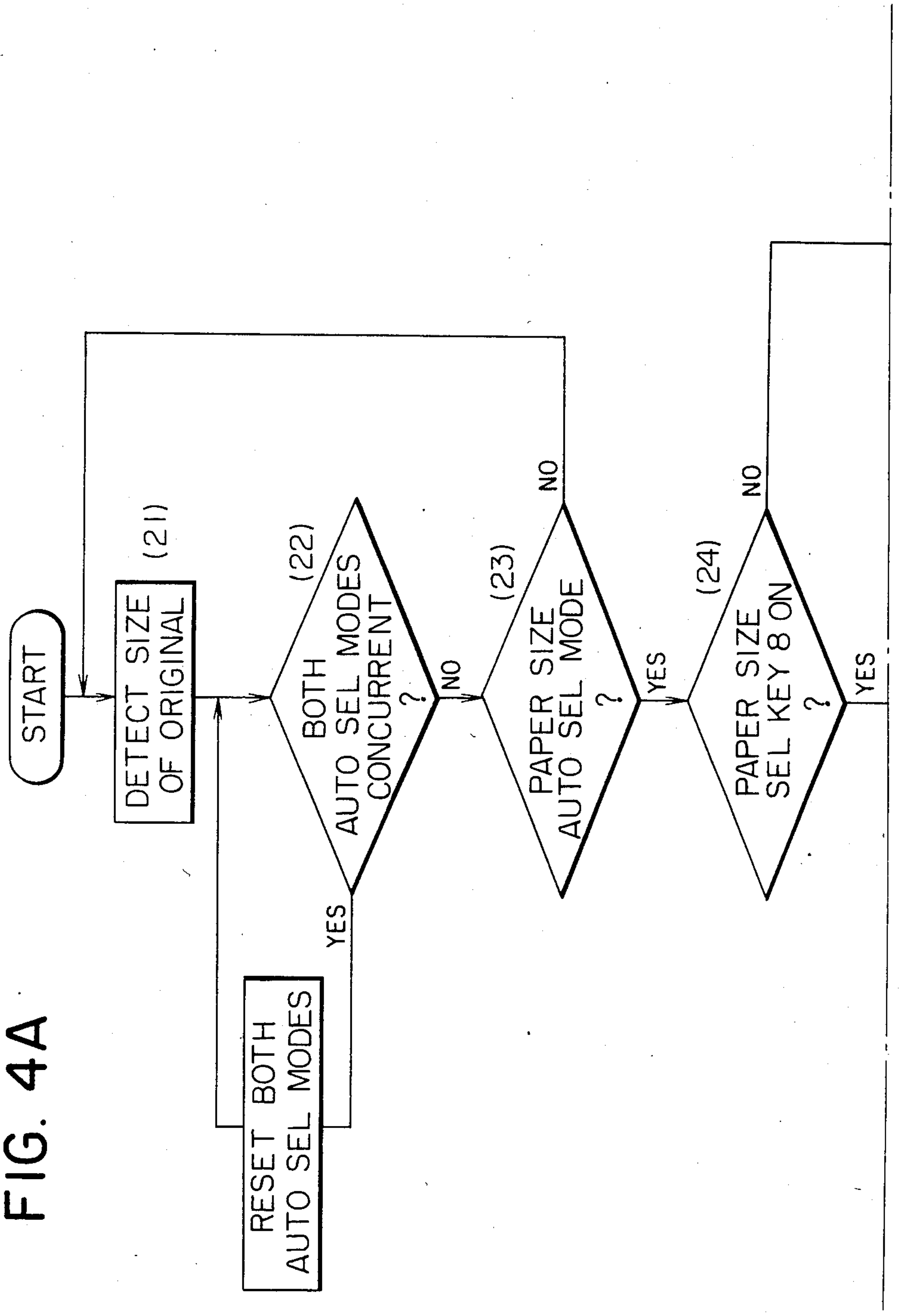

FIG. 4 is the flow chart showing an example of the control sequence in the paper size automatic selection mode.

The original size is detected by the original size detector 26, and setting of the reproduction factor by the reproduction factor selection key 9 and setting of the paper size automatic selection mode are awaited in step 21. The mode operation means 21*a* then checks in step 22 if both the reproduction factor automatic selection mode and the paper size automatic selection mode are selected. If YES in step 22, the two modes are released. However, if NO in step 22, it is checked in step 23 if the selected mode is the paper size automatic selection mode. If NO in step 23, the flow returns to step 21. If YES in step 23, it is checked in step 24 if there is a paper size selection input from the paper size selection key 8. If YES in step 24, the set paper size automatic selection mode is released by the resetting means 21*b* and the paper size selected by the paper size selection key 8 is set in step 25. Depression of the stop key 3 or the copy start key 2 is awaited in steps 26 and 27. When the stop key 3 is depressed, the paper size set in step 24 is cancelled, and selection of either automatic selection mode together with a paper size and a reproduction factor is awaited in step 30. However, when the copy start key 2 is depressed, the paper size selected in step 24 is set in step 28 and the copying operation is started in step 29. However, if NO in step 24, depression of the copy start key 2 is awaited in step 31. When the copy start key 2 is depressed, the paper size automatic selection mode is executed. Thus, the paper size is selected in accordance with the original size detected in step 21 and the set reproduction factor, and the flow advances from step 29 to step 32.

Figure 5:
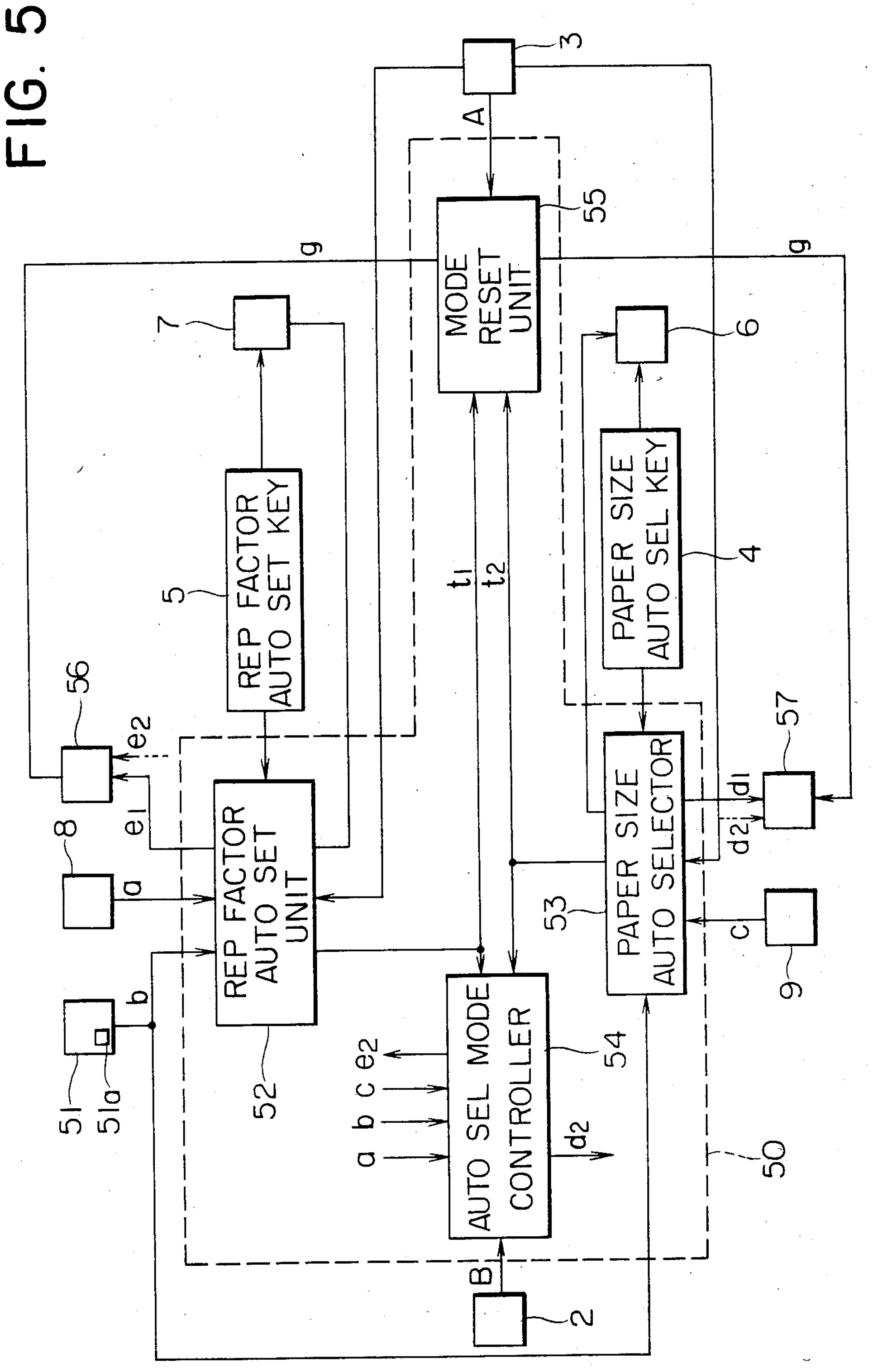
FIG. 5 is a block diagram of a control circuit according to a second embodiment of the present invention.

A second embodiment of the present invention will be described. Since the copying machine according to the present invention has substantially the same configuration as that shown in FIG. 1, a description with reference to FIG. 1 will be omitted. FIG. 5 is a block diagram of a control circuit in the copying machine according to the second embodiment of the present invention.

Referring to FIG. 5, members 2 to 9 are the same as those in FIG. 1. A controller 50 surrounded by a dotted line comprises a microprocessor or the like. An automatic document feeder (ADF) 51 has an original size detector 51*a* as an original size detection means. A reproduction factor automatic set unit 52 in the controller 50 operates when the reproduction factor automatic set key 5 is depressed. The unit 52 calculates the reproduction factor in response to a paper size signal a from the paper size selection key 8 and an original size signal b from the original size detector 51*a*. The unit 52 checks if the calculated reproduction factor falls within a preset range, e.g., 64% to 142%. When the calculated reproduction factor falls within the preset range, the unit 52 supplies a reproduction factor signal e1 to a driver 56 to be described later. However, when the calculated reproduction factor falls outside the preset range, the unit 52 turns off or flashes the reproduction factor automatic selection indicator 7. A paper size automatic selector 53 operates when the paper size automatic selection key 4 is depressed. The selector 53 selects a paper size in response to a reproduction signal c from the reproduction factor selection key 9 and the original size signal b. The selector 53 checks if the selected paper size is one of paper sizes which can be set in the copying machine. If the selected paper size is one of such paper sizes, the selector 53 supplies a paper size signal d1 designating the selected paper size to a driver 57 to be described later. However, when the selected paper size is not one of such paper sizes, the selector 53 turns off or flashes the paper size automatic selection indicator 6. An automatic selection mode controller 54 receives a reproduction factor automatic selection disable signal t1 or a paper size automatic selection disable signal t2 representing that an automatic selection mode selected by the reproduction factor automatic set unit 52 or the paper size automatic selector 53 cannot be selected, respectively, a copy start signal B, a reproduction factor signal c, a paper size signal a, and an original size signal b. The controller 54 generates an adjusted paper size signal e2 or an adjusted reproduction factor signal d2. A mode reset unit 55 receives a reset state signal A and the reproduction factor automatic selection disable signal t1 or the paper size automatic selection disable signal t2. The reset unit 55 supplies a stand-by signal g to the driver 56 or 57. The driver 56 drives the optical scanning system to move the lens (not shown) to a desired reproduction factor position in response to a reproduction factor signal e1 from the unit 52 or a reproduction factor signal e2 from the automatic selection mode controller 54. The driver 57 drives the paper feed system and has a paper size detection means. The driver 57 selects a paper sheet in a suitable paper feed cassette (not shown) and supplies it to the photosensitive drum position (not shown) in response to a paper size signal d1 from the paper size automatic selector 53 or a paper size signal d2 from the automatic selection mode controller 54.

The operations in the reproduction factor automatic selection mode and the paper size automatic selection mode will be described.

When the operator designates B5 size, for example, by depressing the paper size set key 5, "B5" is displayed at the paper size display 10. When the operator subsequently depresses the reproduction factor automatic set key 5, the reproduction factor automatic selection mode indicator 7 is turned on to indicate that the reproduction factor automatic selection mode is selected. When the operator depresses the copy start key 2 at this time, the ADF 51 is operated and the original size is detected by the original size detector 51*a*. The unit 52 calculates the reproduction factor in accordance with the original size signal b and the paper size signal a. The unit 52 checks if the calculated reproduction factor falls within a preset range. If the calculated reproduction factor falls within the preset range, the unit 52 supplies the reproduction signal e1 to the driver 56 for driving the optical scanning system. Then, in response to the reproduction signal e1, the driver 56 moves the lens to the position corresponding to the calculated reproduction factor.

When the calculated reproduction factor falls outside the preset range, the copying operation is temporarily stopped. The reproduction factor automatic selection mode indicator 7 is turned off or flashed. The unit 52 supplies the reproduction factor automatic selection disable signal t1 to the automatic selection mode controller 54 and the mode reset unit 55. Thereafter, depression of the copy start key 2 or the stop key 3 by the operator is awaited. When the copy start key 2 is depressed, the copy start signal B and the reproduction factor automatic selection disable signal t1 are supplied to the automatic selection mode selector 54. In response to the signals B and t1 and the original size signal b and the paper size signal a, the selector 54 calculates an adjusted reproduction factor and supplies a reproduction factor signal e2 to the driver 56 for the optical scanning system. In this case, a reproduction factor (65% or 142%) closest to the reproduction factor calculated from the original size b and the paper size signal a can be selected.

However, when the stop key 3 is depressed, the reset state signal A and the reproduction factor automatic selection disable signal t1 are supplied to the mode reset unit 55. The unit 55 supplies a stand-by signal g to the driver 56, and resetting of a paper size by the paper size selection key 8 is awaited. In response to the stand-by signal g, the driver 56 stops the setting operation of the lens.

When the operator depresses the reproduction factor selection key 9 to select a reproduction factor of e.g., 100%, "100%" is displayed at the reproduction factor display 11. When the operator depresses the paper size automatic selection key 4 next, the paper size automatic selection mode indicator 6 is turned on to indicate that the paper size automatic selection mode is selected. When the operator depresses the copy start key 2 at this time, the ADF 51 is operated, and the original size detector 51*a* detects the original size. The paper size automatic selector 53 selects the paper size in response to the original size signal b and the reproduction factor signal c. The selector 53 checks if the selected paper size is one of paper sizes which can set in the copying machine. If the selected paper size is one of such paper sizes, the selector 53 supplies a paper size signal d1 to the driver 57 of the paper feed system.

However, if the selected paper size is not one of such paper sizes, the copying operation is temporarily stopped. The paper size automatic selection mode indicator 6 is turned off or flashed. The selector 53 supplies the paper size automatic selection disable signal t2 to the automatic selection mode controller 54 and the mode reset unit 55. Depression of the copy start key 2 or the stop key 3 by the operator is awaited. When the copy start key 2 is depressed, the copy start signal B and the paper size automatic selection disable signal t2 are supplied to the automatic selection mode controller 54. In response to the original size signal b and the reproduction factor signal c, the controller 54 selects an adjusted paper size from those available in the copying machine and supplies a paper size signal d2 selecting the adjusted paper size to the driver 57 for the paper feed system.

However, when the stop key 3 is depressed, the reset state signal A and the paper size automatic selection disable signal t2 are supplied to the mode reset unit 55. The mode reset signal 55 supplies the standby signal g to the driver 57, and resetting of the reproduction factor by the reproduction factor selection key 9 is awaited. In other words, in response to the stand-by signal g, the driver 57 stops the operation for selecting the paper size.

The control operation will be described with reference to the flow charts shown in FIGS. 6 and 7.

Figures 6, 6B:
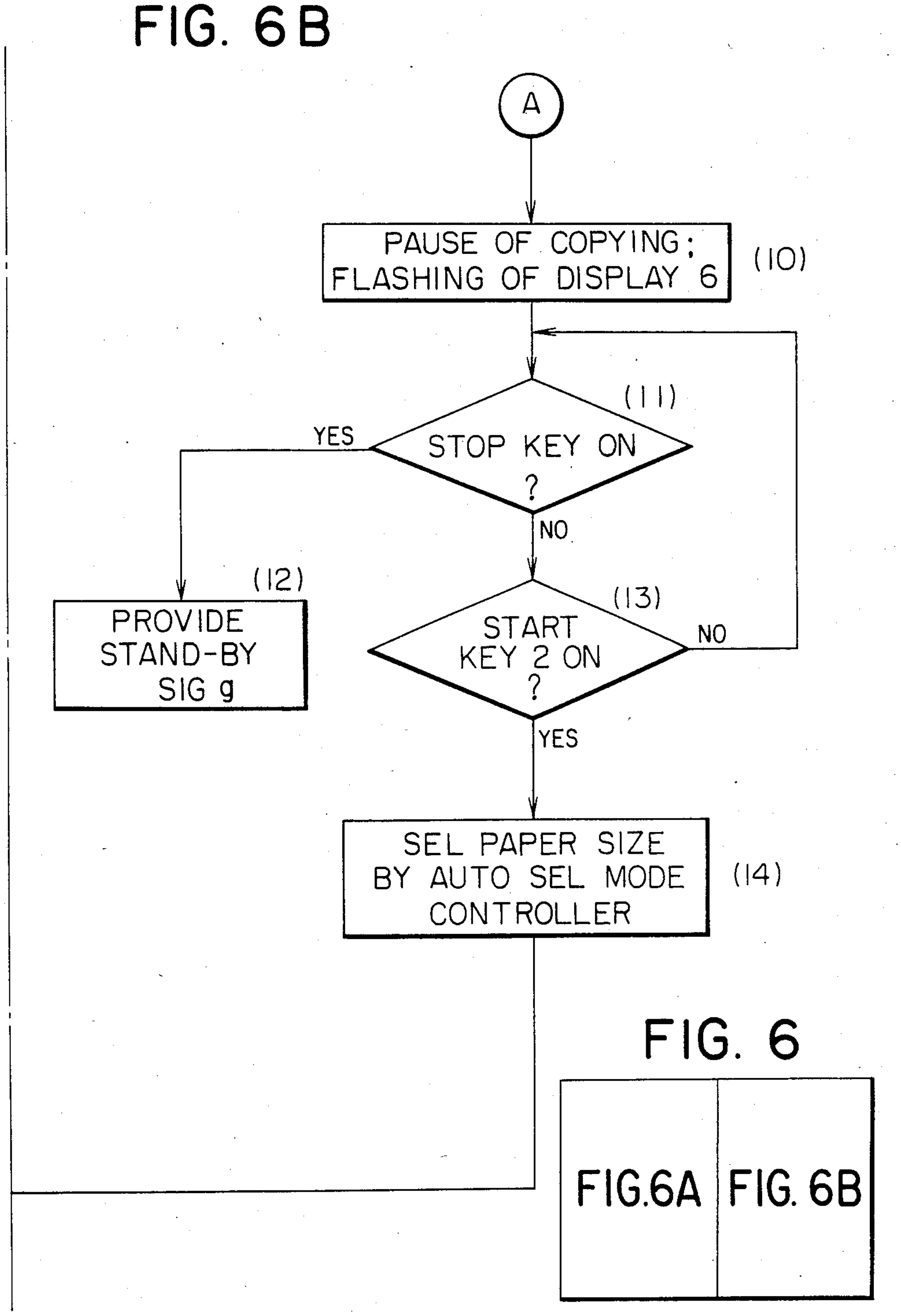
Figure 6A:
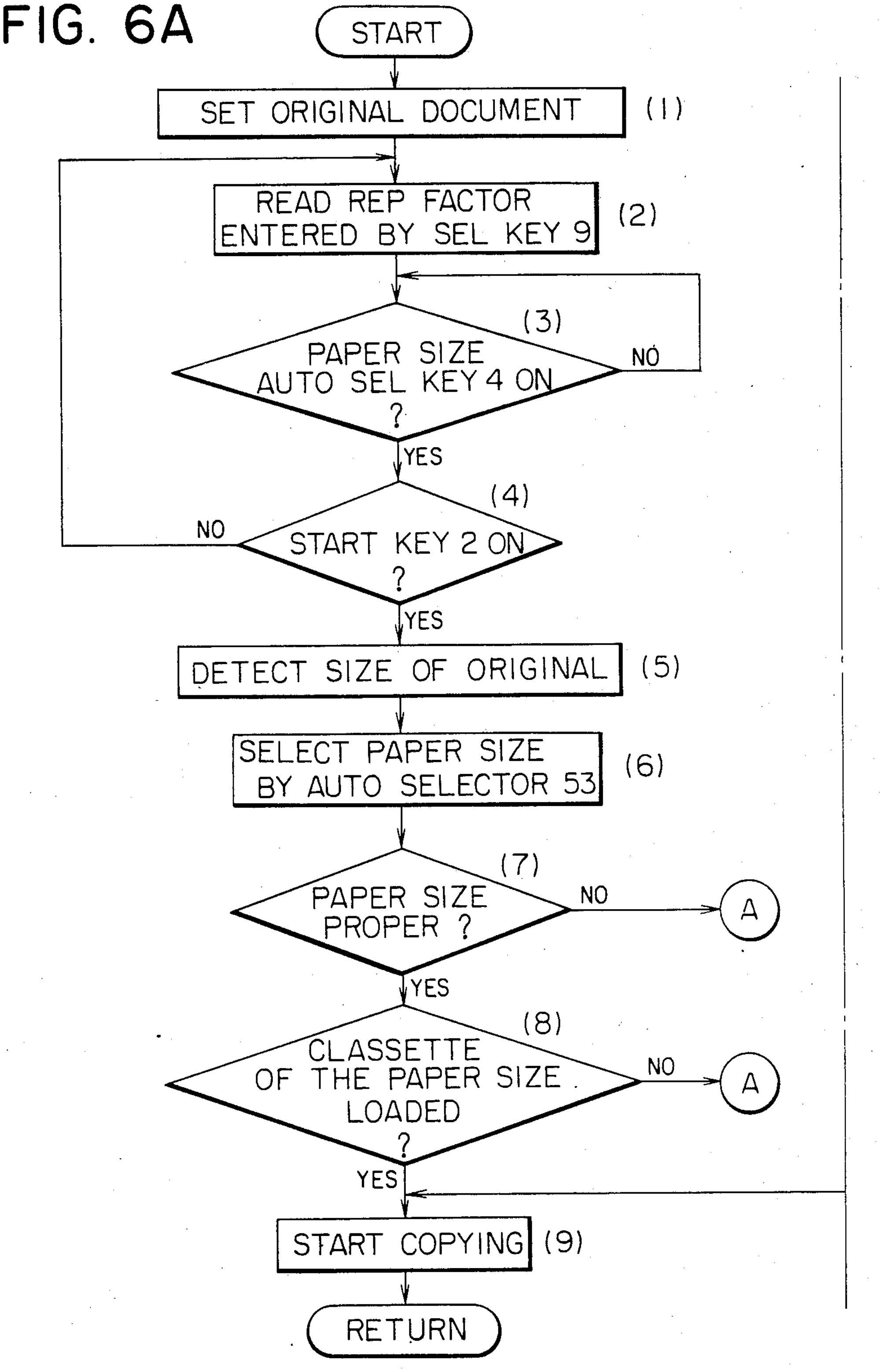

FIG. 6 shows the flow chart for explaining the control sequence in the paper size automatic selection mode. The program of this flow chart is stored in a ROM of the controller 50.

The original document is set on an original support (not shown) in step 1. The reproduction factor input from the reproduction factor selection key 9 is fetched in step 2, and depression of the paper size automatic selection key 4 is awaited in step 3. When the paper size automatic selection key 4 is depressed in step 3, depression of the copy start key 2 is awaited in step 4. When the copy start key 2 is depressed, the ADF 51 is operated to detect the original size in step 5. The original size signal b is supplied to the paper size automatic selector 53. The selector 53 selects a paper size in accordance with the reproduction factor fetched in step 2 and the detected original size, in step 6. It is checked in step 7 if the paper size selected in step 6 is one of paper sizes which can be set in the copying machine. If YES in step 7, it is checked in step 8 if the cassette containing paper sheets of the selected paper size is mounted on the copying machine. If YES in step 8, the copying operation is started in step 9. However, when NO in step 7 or 8, the flow advances to step 10 wherein the copying operation is temporarily stopped, and the paper size automatic selection indicator 6 is turned off or flashed. Depression of the stop key 3 or the copy start key 2 is awaited in steps 11 and 13. When the stop key 3 is depressed, the mode reset unit 55 supplies a stand-by signal g to the driver 57 in the step 12. However, when the copy start key 2 is depressed, the automatic selection mode controller 54 selects a paper size which allows reproduction of the entire image of the original document and which can be set in the copying machine in step 14. The controller 54 supplies a paper size signal d2 designating the selected paper size to the driver 57. Thereafter, the flow returns to step 9 and the copying operation is started.

Figure 7B:
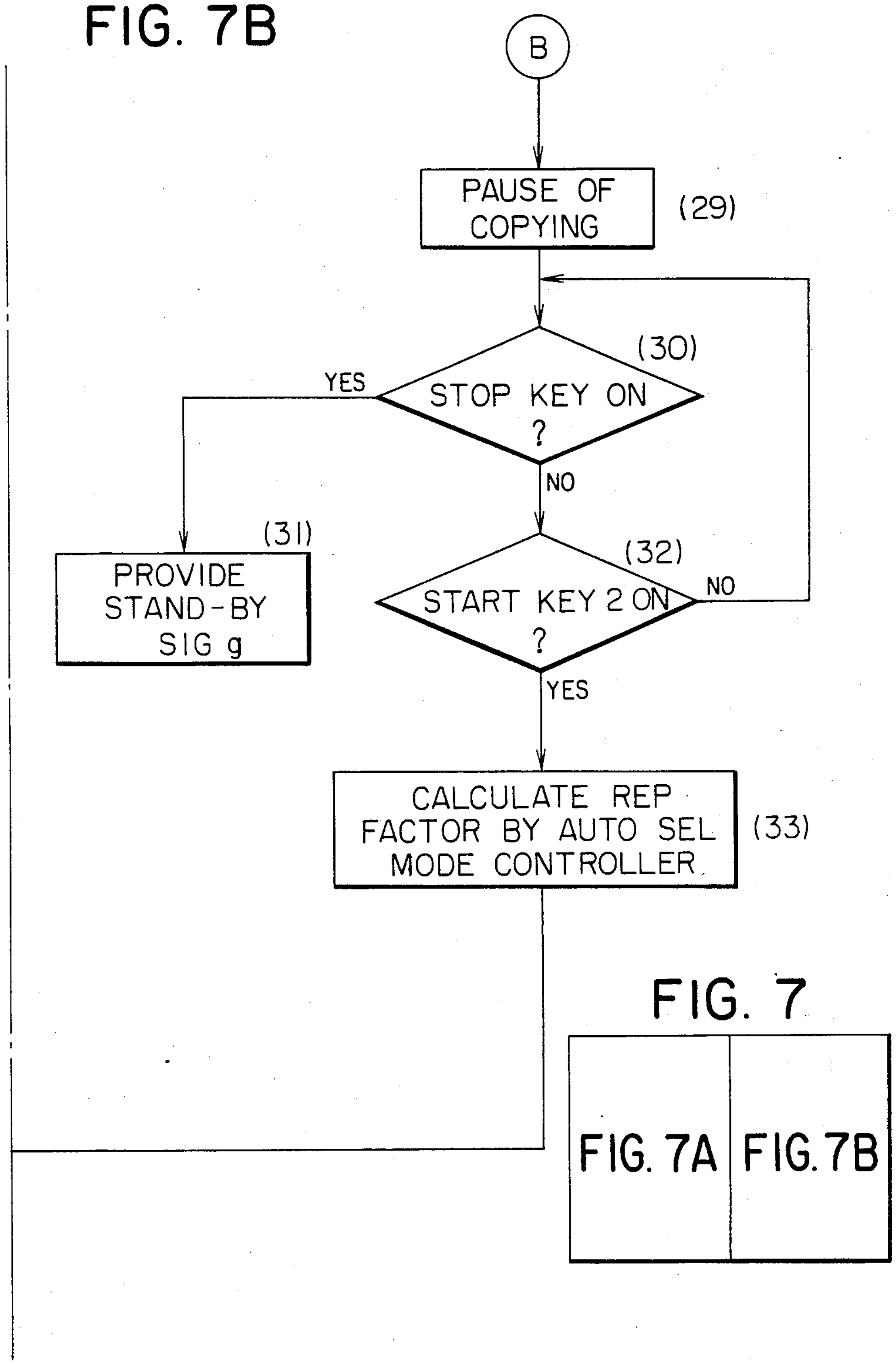
Figure 7A:
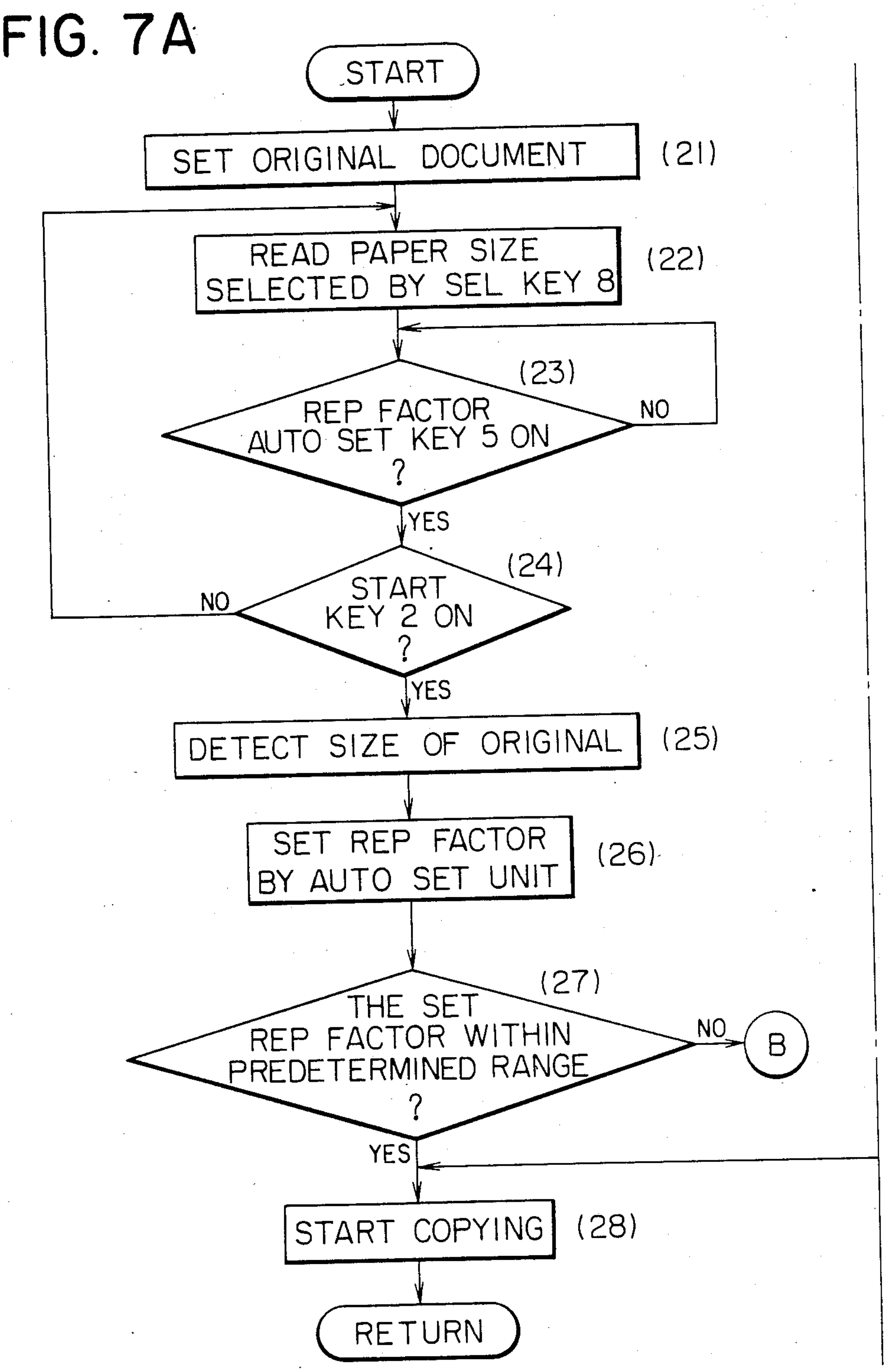

FIG. 7 shows the flow chart for explaining the control sequence in the reproduction factor automatic selection mode. The program of this sequence is also stored in the ROM of the controller 50.

The original document is set on the original support (not shown) in step 21. The paper size selected by the paper size selection key 8 is fetched in step 22. Depression of the reproduction factor automatic set key 5 is awaited in step 23. When the reproduction factor automatic set key 5 is depressed in step 23, depression of the copy start key 2 is awaited in step 24. When the copy start key 2 is depressed, the ADF 51 is operated to detect the original size in step 25. The original size signal b is supplied to the reproduction factor automatic set unit 52. The unit 52 sets the reproduction factor in step 26 in accordance with the paper size fetched in step 22 and the detected original size. It is then checked in step 27 if the reproduction factor set in step 26 is within a predetermined range. If YES in step 27, the unit 52 supplies a reproduction factor signal e1 to the driver 56 so as to move the lens to the position of the selected reproduction factor and starts the copying operation in step 28. However, if NO in step 27, the flow advances to step 27 wherein the copying operation is temporarily stopped, and the reproduction factor automatic selection mode indicator 7 is turned off or flashed. Depression of the stop key 3 or the copy start key 2 is awaited in steps 30 and 32. When the stop key 3 is depressed, the mode reset unit 55 supplies a stand-by signal g to the driver 56 in step 31. However, when the copy start key 2 is depressed, the automatic selection mode controller 54 calculates the adjusted reproduction factor in accordance with the original size signal b and the paper size signal a in step 33. The controller 54 supplies a reproduction factor signal e2 to the driver 56 for the optical scanning system and moves the lens to the position corresponding to the adjusted reproduction factor. The flow then advances to step 28 and the copying operation is started.

As described above, according to the second embodiment of the present invention, when a conflicting combination of parameters is selected in the paper size automatic selection mode or the reproduction factor automatic selection mode, this fact is signalled to the operator. However, even if a conflicting combination of parameters is selected, if the copying operation can be performed with an adjusted paper size or reproduction factor, it is performed as needed.

A third embodiment of the present invention will be described with reference to FIGS. 1, 2, 8 and 9. Since the third embodiment is different from the first embodiment only in the operation mode of the mode operation means 21*a*, the operation thereof will be mainly described hereinafter.

When the operator depresses the reproduction factor automatic set key 5 and then accidentally depresses the paper size automatic selection key 4, the mode operation means 21*a* determines that a conflicting selection has been made since both the reproduction factor automatic selection mode and the paper size automatic selection mode have been selected. Then, the mode operation means 21*a* releases the reproduction factor automatic selection mode, turns off the reproduction factor automatic selection mode indicator 7, sets the paper size automatic selection mode and turns on the paper size automatic selection mode indicator 6.

On the other hand, when the operator depresses the paper size automatic selection key 4 and then accidentally depresses the reproduction factor automatic set key 5, the means 21*a* releases the paper size automatic selection mode and turns off the paper size automatic selection mode indicator 6. The means 21*a* sets the reproduction factor automatic selection mode and turns on the reproduction factor automatic selection mode indicator 7.

The control sequence in this embodiment will be described with reference to the flow charts shown in FIGS. 8 and 9.

Figures 8, 8B:
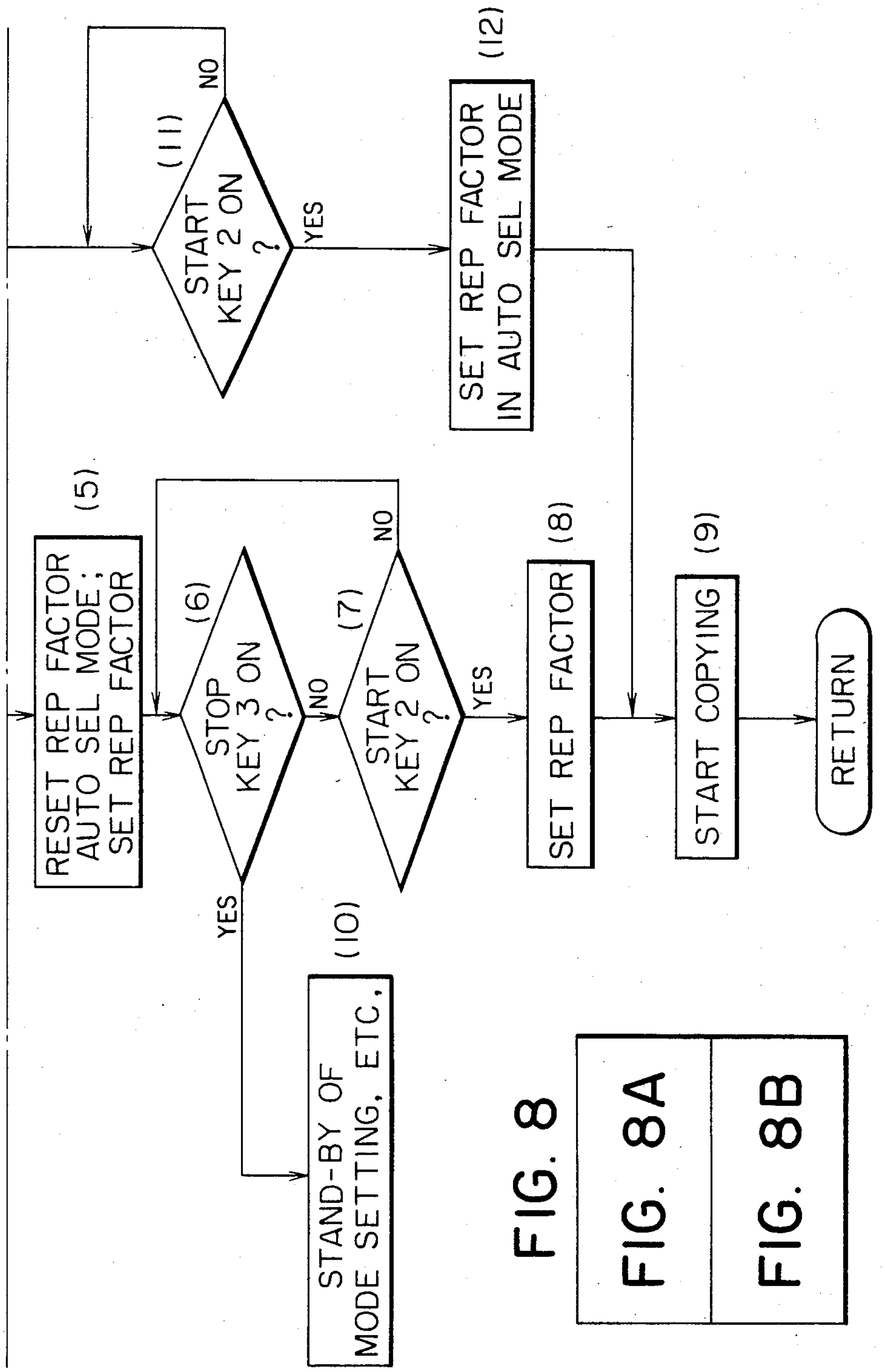
Figure 8A:
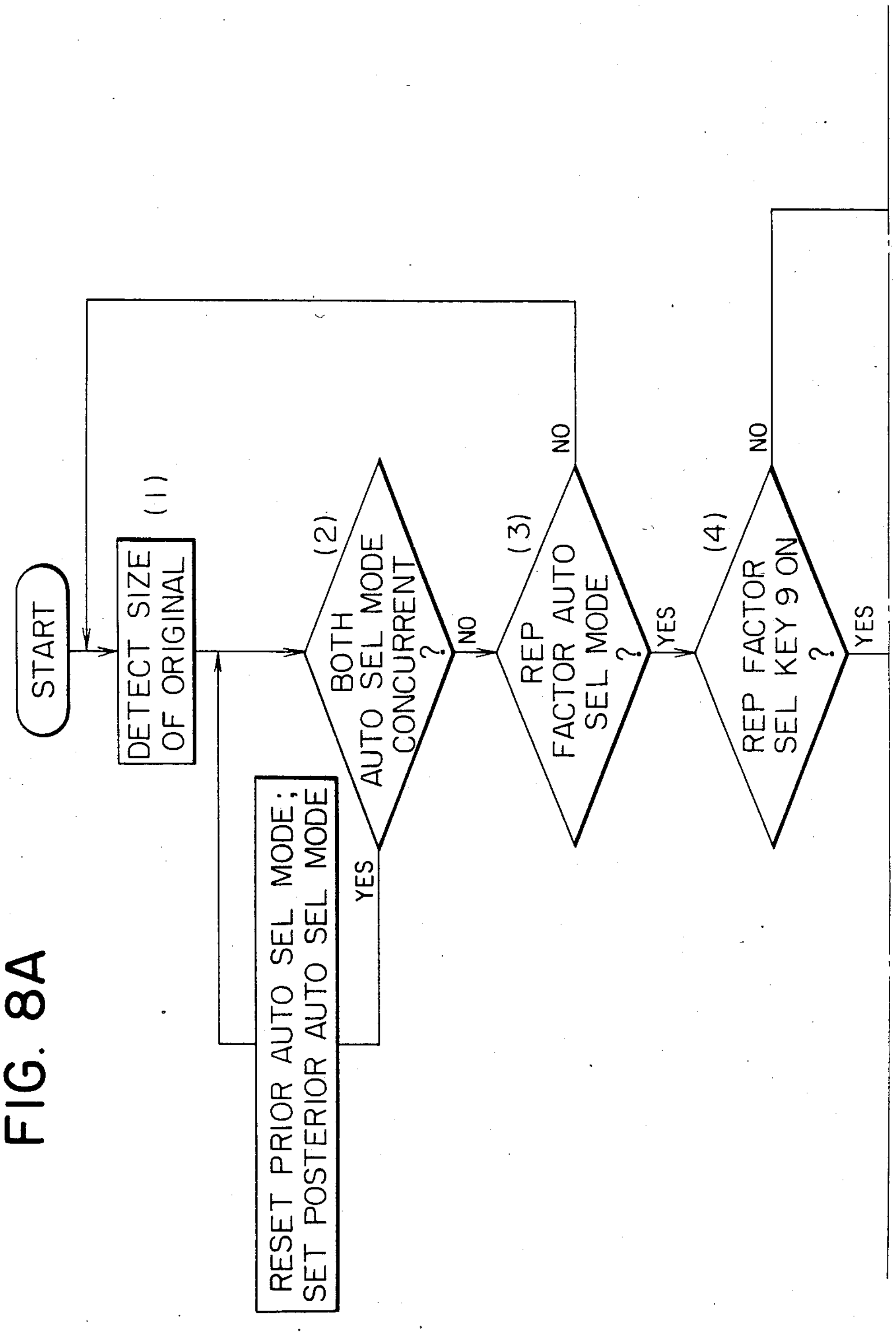

FIG. 8 shows the flow chart of the control sequence in the reproduction factor automatic selection mode in the third embodiment.

The original size is detected by the original size detector 26, and setting of a paper size by the paper size selection key 8 and the reproduction factor automatic selection mode is awaited in step 1. Then, the means 21*a* checks in step 2 if the reproduction factor automatic selection mode and the paper size automatic selection mode are both set. If YES in step 2, the automatic selection mode which is set first is released, and the automatic selection mode which is set later is set again. However, if NO in step 2, it is checked in step 3 if the set automatic selection mode is the reproduction factor automatic selection mode. If NO in step 3, the flow returns to step 1. If YES in step 3, it is checked in step 4 if a reproduction factor has been set by the reproduction factor selection key 9. The following steps are the same as those described with reference to FIG. 3, and a description thereof will be omitted.

Figure 9B:
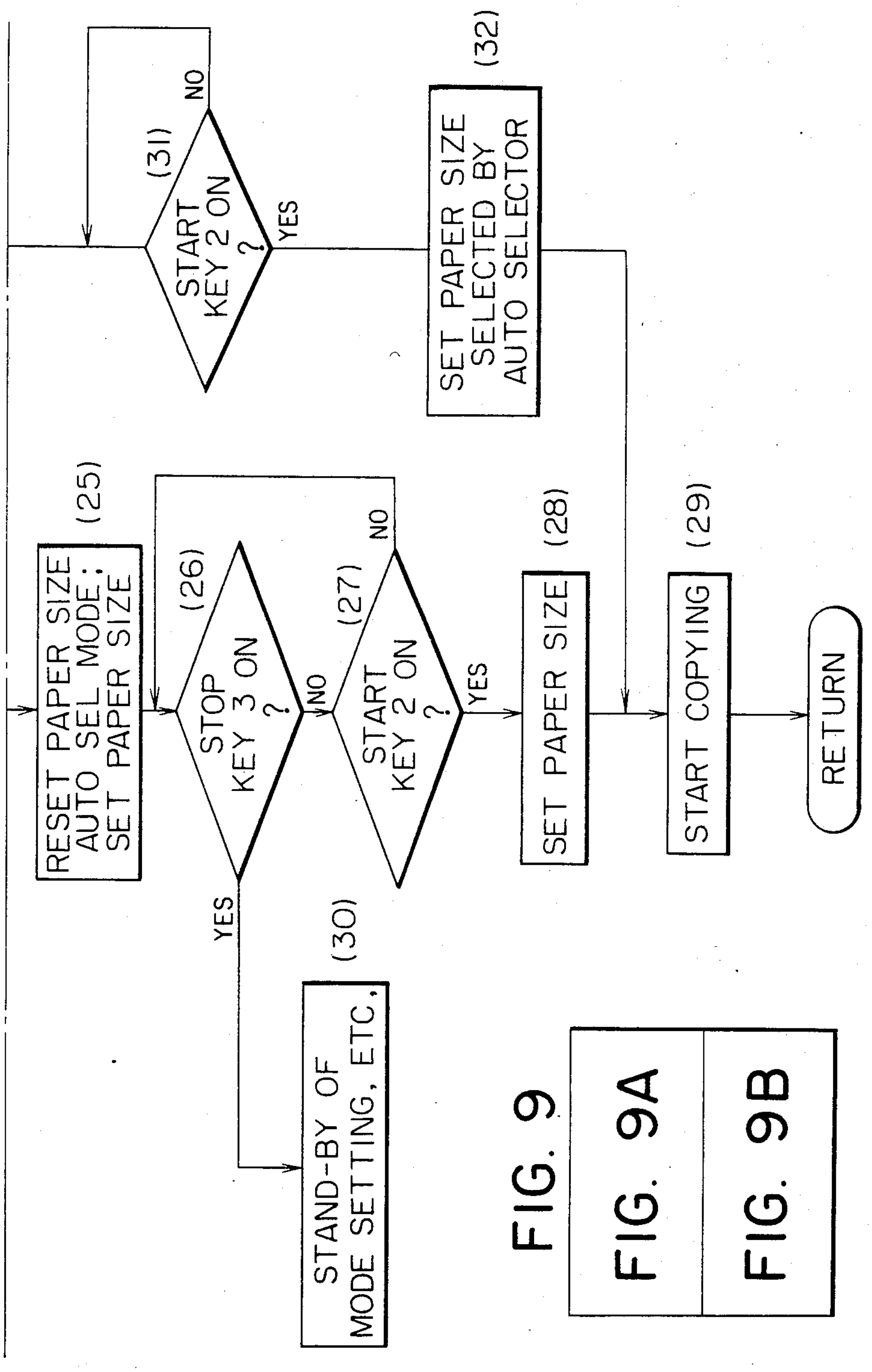
Figure 9A:
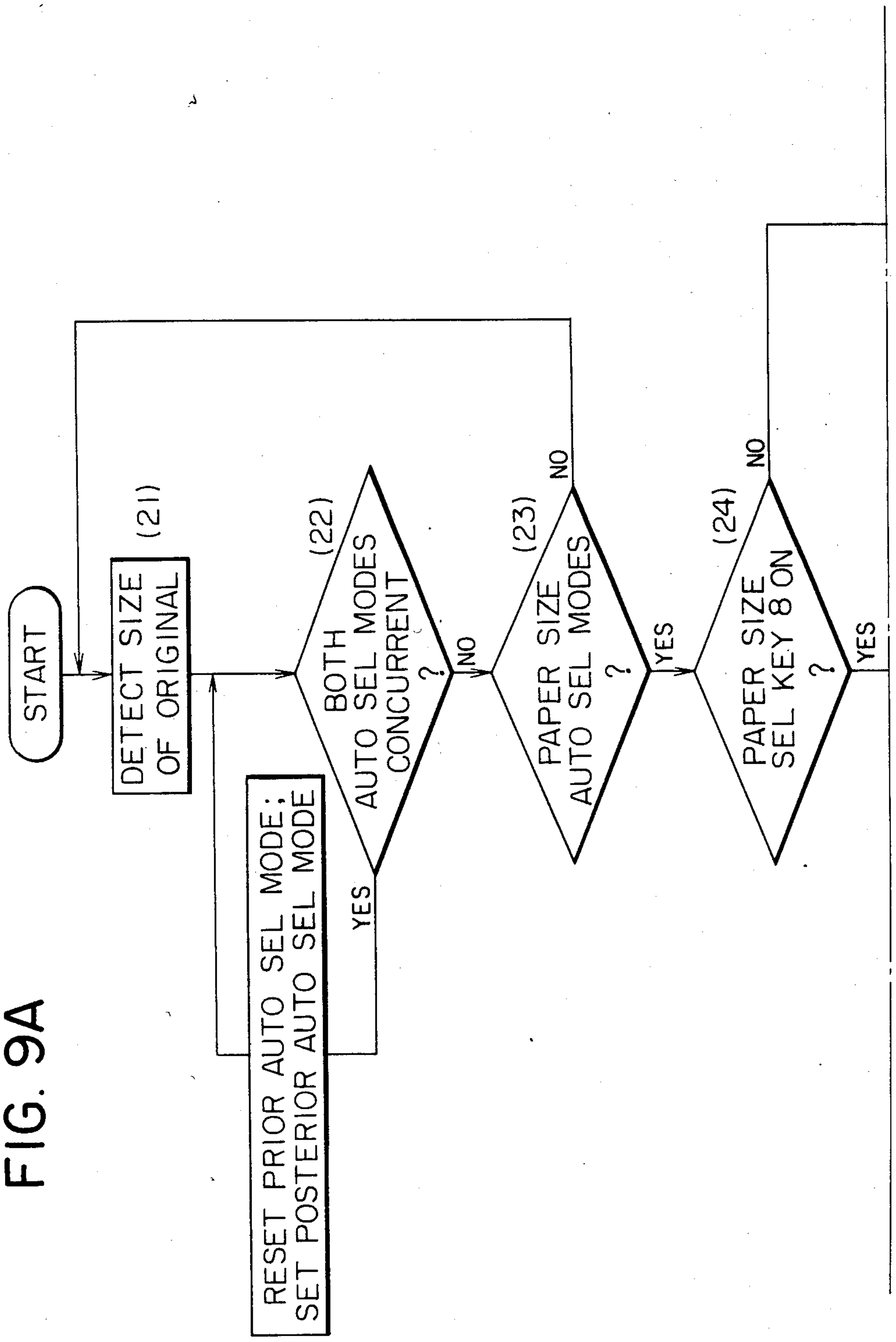

FIG. 9 shows the flow chart of the control sequence in the paper size automatic selection mode according to the third embodiment of the present invention.

The original size is detected by the original size detector 26, and setting of a reproduction factor by the reproduction factor selection key 9 and the paper size automatic selection mode is awaited in step 21. The mode operation means 21*a* then checks in step 22 if the reproduction factor automatic selection mode and the paper size automatic selection mode are both set. If YES in step 22, the automatic selection mode which is set first is released, and the automatic selection mode which is set later is set again. However, if NO in step 22, it is checked in step 23 if the selected automatic selection mode is the paper size automatic selection mode. If NO in step 23, the flow returns to step 21. If YES step 23, it is checked in step 24 if a paper size has been set by the paper size selection key 8. The following steps are the same as those described with reference to FIG. 4, and a description thereof will be omitted.

The present invention is not limited to those described above, and various changes and modifications may be made within the spirit and scope of the appended claims.

What we claim is:

1. An image forming system comprising:

original size input means for inputting a size of an original;

paper size input means for inputting a size of a copy paper;

magnification factor input means for inputting a magnification factor;

means for selecting a mode for determining the magnification factor in accordance with the original size and the paper size; and means for cancelling the mode for determining the magnification factor when a magnification factor is input through said magnification factor input means after the mode for determining the magnification factor is selected by said selecting means.

2. A system according to claim 1, further comprising means for indicating that the selection of the mode for determining the magnification factor is cancelled.

3. An image forming system comprising:

original size input means for inputting a size of an original;

paper size input means for inputting a size of a copy paper;

magnification factor input means for inputting a magnification factor;

means for selecting a mode for determining the paper size in accordance with the original size and the magnification factor; and means for cancelling the selection of the mode for determining the paper size when a paper size is input through said paper size input means after the mode for determining the paper size is selected by said selecting means.

4. A system according to claim 3, further comprising means for indicating that the selection of the mode for determining the paper size is cancelled.

5. An image forming system comprising:

original size input means for inputting a size of an original;

paper size input means for inputting a size of a copy paper;

magnification factor input means for inputting a magnification factor;

first selecting means for selecting a mode for determining the magnification factor in accordance with the original size and the paper size;

second selecting means for selecting a mode for determining the paper size in accordance with the original size and the magnification factor; and means for prohibiting simultaneous selection of the mode for determining the magnification factor and the mode for determining the paper size.

6. A system according to claim 5, further comprising first display means for displaying that the mode for determining the magnification factor is selected, and second display means for displaying that the mode for determining the paper size is selected.

7. An image forming system comprising:

original size input means for inputting a size of an original;

paper size input means for inputting a size of a copy paper;

means for determining the magnification factor in accordance with the original size and the paper size; and means for discriminating if the magnification factor determined by said determining means is within a predetermined range.

8. A system according to claim 7, wherein said discriminating means comprises means for selecting a magnification factor being within the predetermined range and for enabling to execute a copying operation when the magnification factor determined by said determining means is out of the predetermined range.

9. An image forming system comprising:

original size input means for inputting a size of an original;

magnification factor input means for inputting a magnification factor;

means for determining the paper size in accordance with the original size and the magnification factor; and means for discriminating if the paper size determined by said determining means is available for image formation.

10. A system according to claim 9, wherein said discriminating means comprises means for selecting a paper size being available and enabling to execute a copying operation when the paper size determined by said determining means is not available.

* * * * *